United States Patent [19]

Rodler, Jr. et al.

[11] 4,328,601
[45] May 11, 1982

[54] INFLATABLE BOW

[75] Inventors: Waldo E. Rodler, Jr.; Howard H. Campbell, both of San Jose, Calif.

[73] Assignee: FMC Corporation, Chicago, Ill.

[21] Appl. No.: 106,974

[22] Filed: Dec. 26, 1979

[51] Int. Cl.³ .............................................. B63B 7/08
[52] U.S. Cl. ................................... 114/353; 114/123; 114/270
[58] Field of Search ..................... 9/2 A, 1.1; 440/11, 440/12; 114/123, 68, 270, 29, 267

[56] References Cited

U.S. PATENT DOCUMENTS

| | | | |
|---|---|---|---|
| 1,180,013 | 4/1916 | Cook et al. | 114/270 |
| 2,075,785 | 3/1937 | Van Caneghem | 114/270 |
| 2,967,507 | 1/1961 | Schulz | 114/267 |
| 3,581,701 | 6/1969 | Gehlen et al. | 114/270 |
| 3,750,613 | 8/1973 | Krumsiek et al. | 114/270 |
| 3,983,832 | 10/1976 | Kinder | 114/270 |

FOREIGN PATENT DOCUMENTS

| | | | |
|---|---|---|---|
| 1531581 | 12/1969 | Fed. Rep. of Germany | 114/270 |
| 2521672 | 11/1975 | Fed. Rep. of Germany | 114/123 |
| 6801242 | 7/1968 | Netherlands | 114/29 |

Primary Examiner—Trygve M. Blix
Assistant Examiner—Stephen P. Avila
Attorney, Agent, or Firm—H. M. Stanley; R. B. Megley

[57] ABSTRACT

Structure is provided which provides a changeable bow configuration for a floating hull which requires a bow configuration which facilitates travel through water only part of the time. An amphibious vehicle is an example of such a requirement, wherein the bow of the vehicle hull in the land mode is relatively snub-nosed presenting a hard unyielding surface to ground obstacles such as rocks and mounds as it travels over the terrain. The amphibious vehicle in a sea or water traveling mode generally requires additional buoyancy in the bow to prevent a diving tendency when underway and also requires a shape better adapted to travel along the surface of the water than the snub-nosed bow configuration of the land mode. Left and right moveable bow segments and a lower bow segment are retracted in the land mode to form the snub-nosed or bow. The left, right and lower segments are extended and an inflatable bag attached therebetween is filled to occupy the volume between the extended bow segments and to present a more seaworthy bow configuration in the sea mode. The inflatable bag is deflated and stored behind the bow segments when they are retracted thereby protecting the bag from damage as the snub-nosed bow travels over the land obstacles.

17 Claims, 15 Drawing Figures

FIG_1
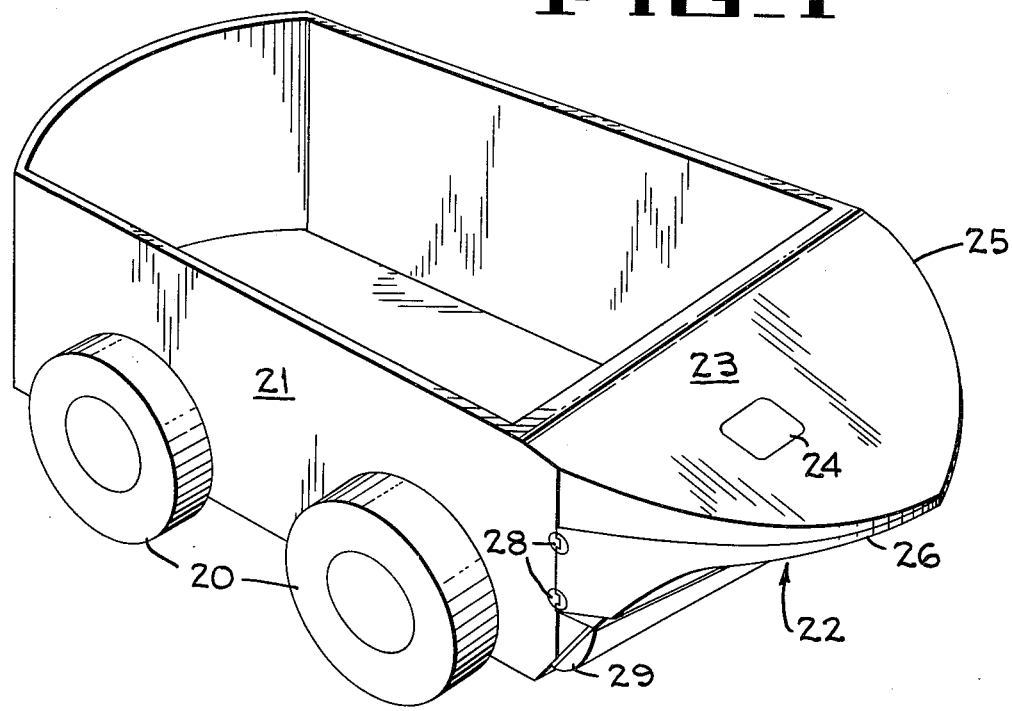
FIG_2
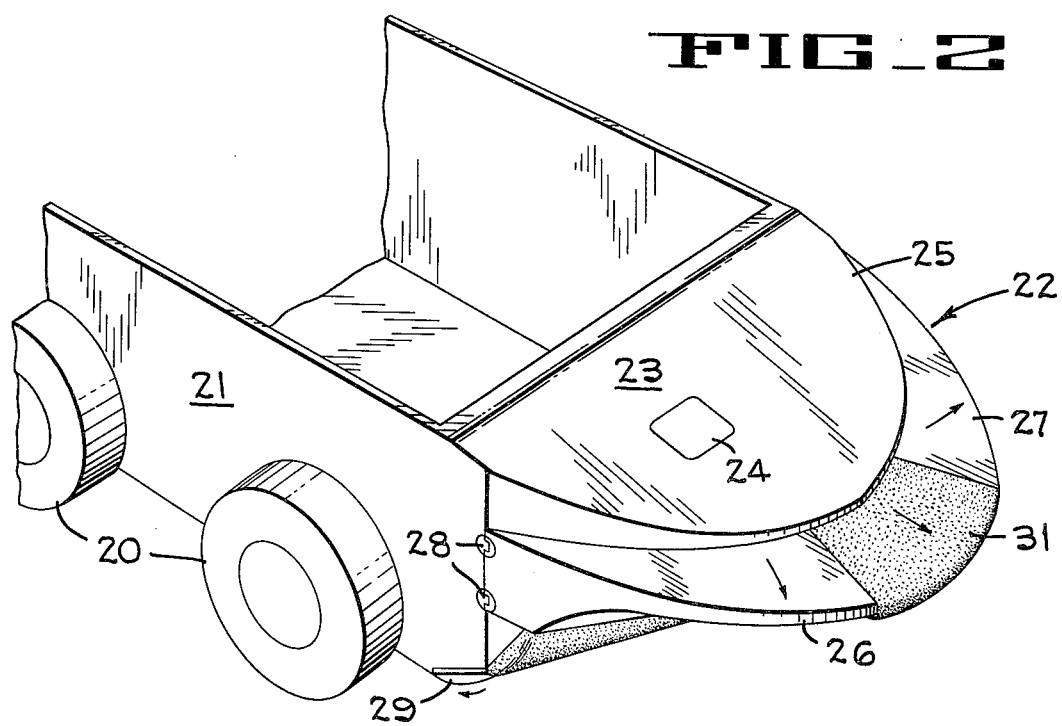

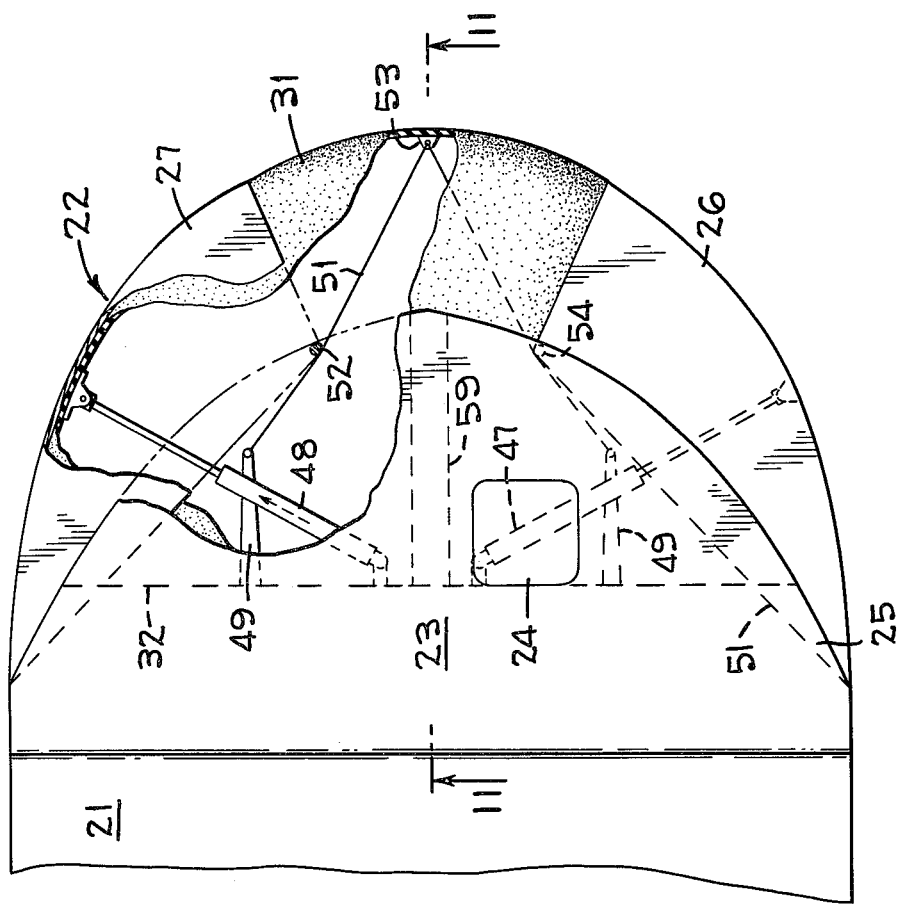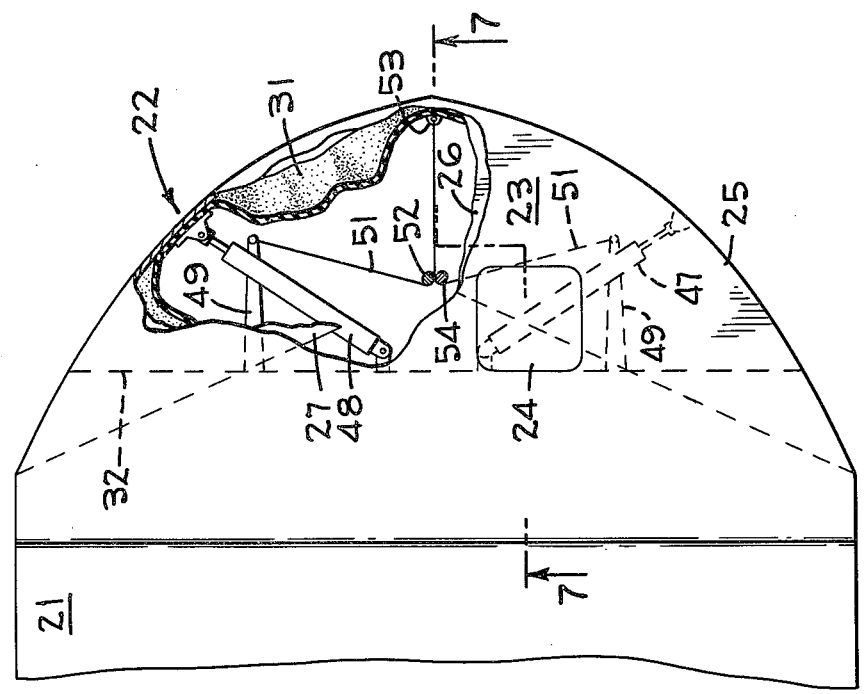

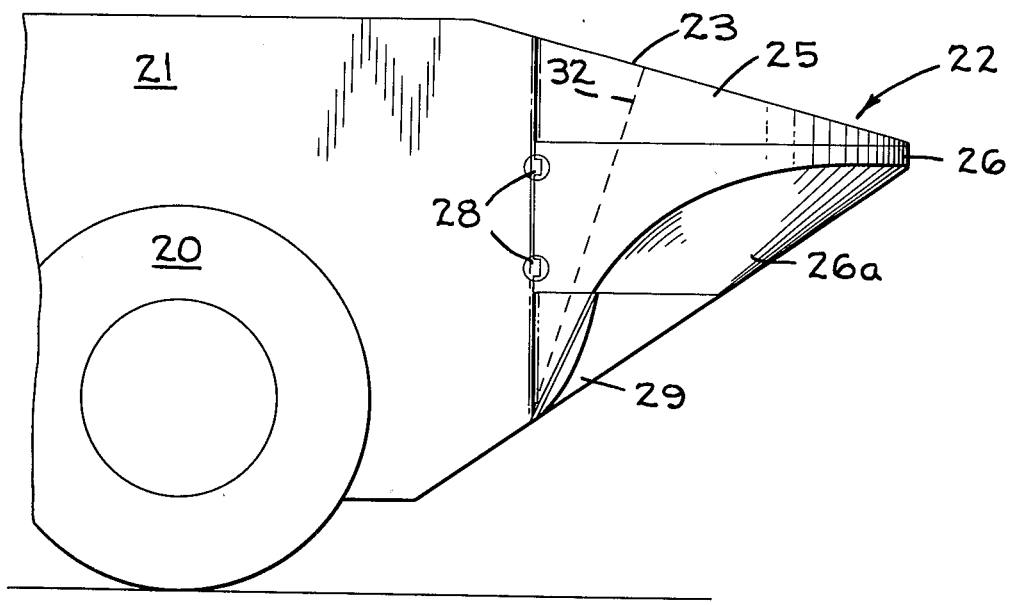
FIG_4
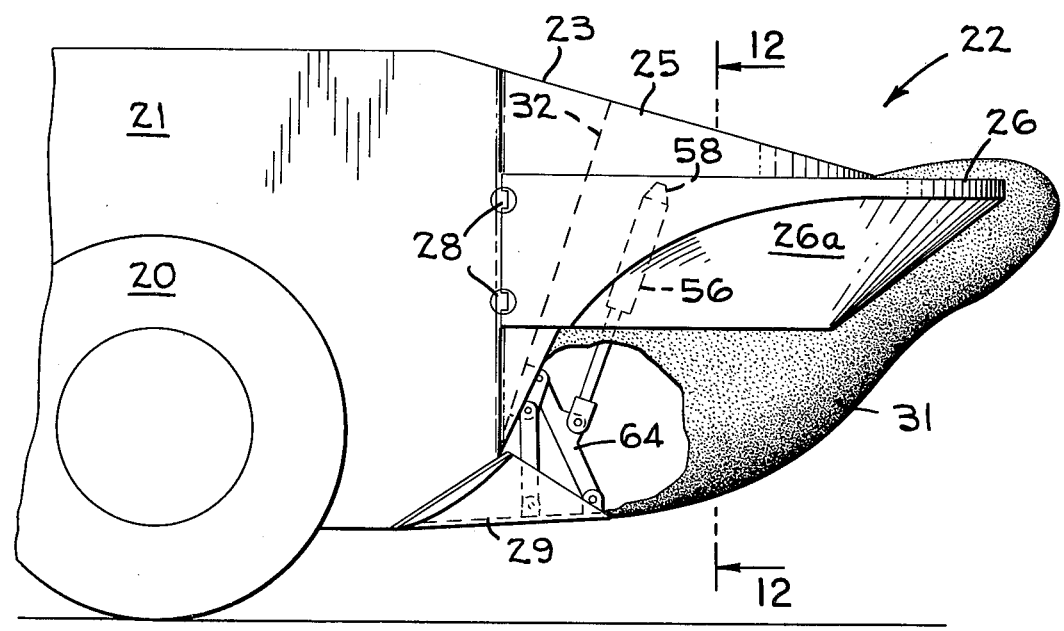
FIG_6

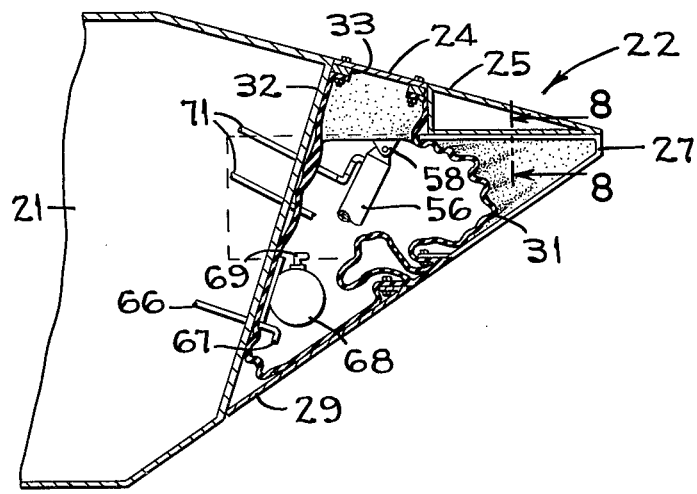
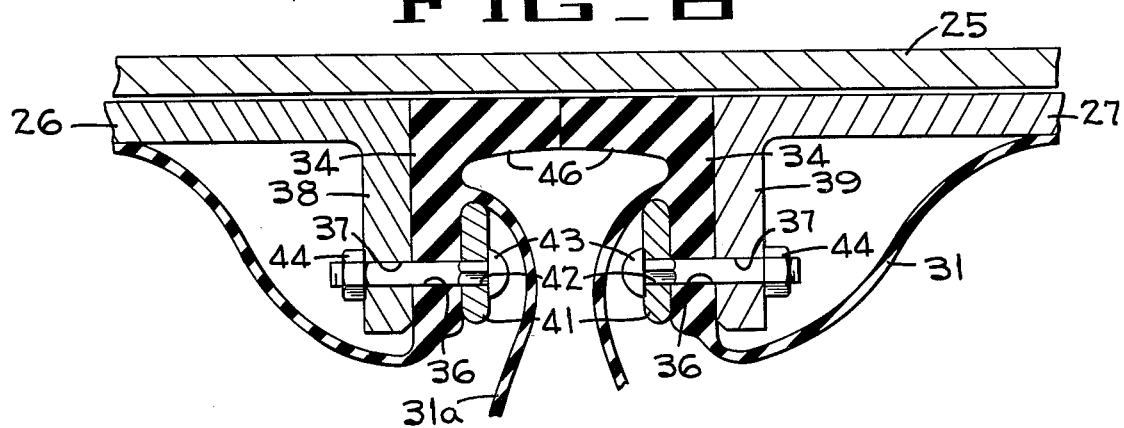
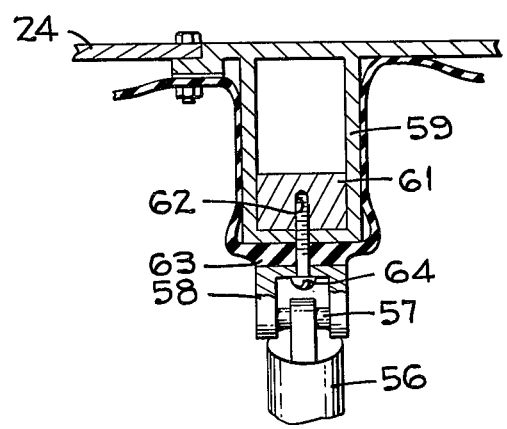

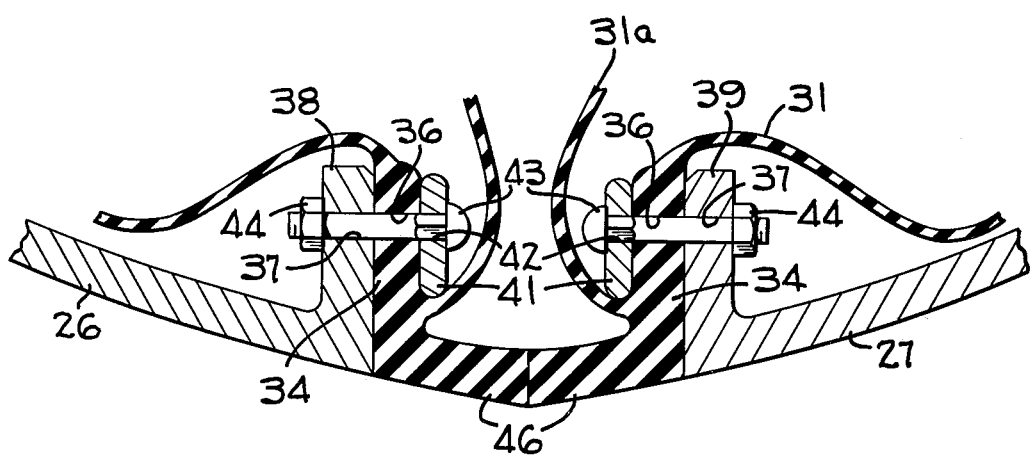
FIG_8A

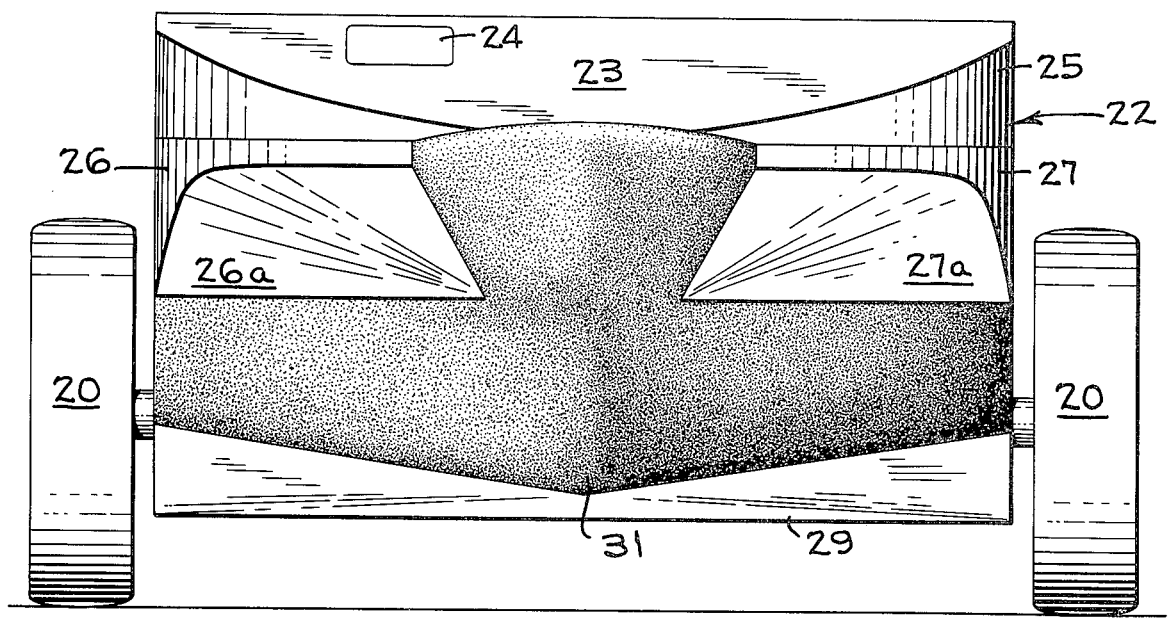
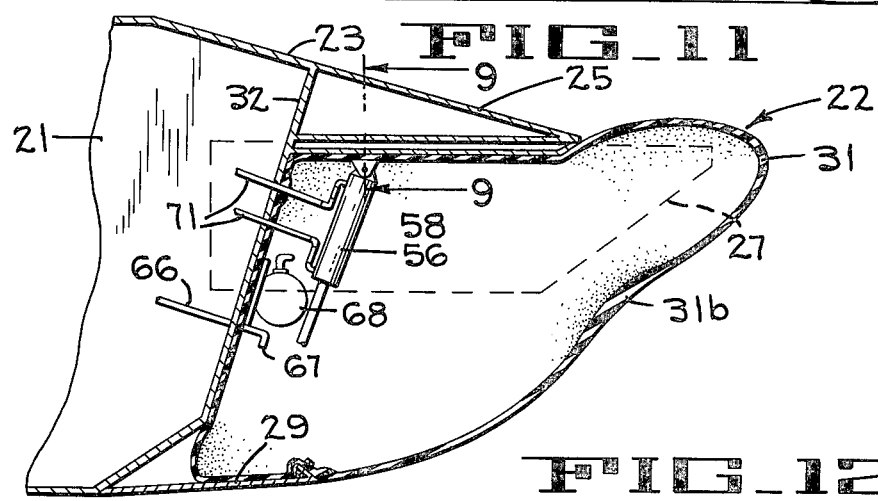
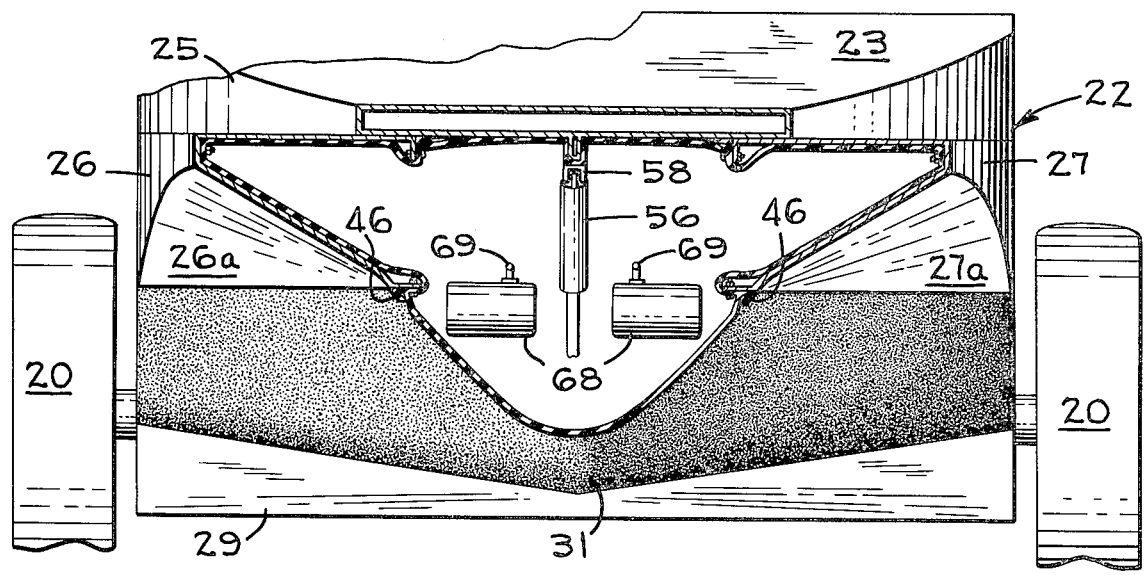

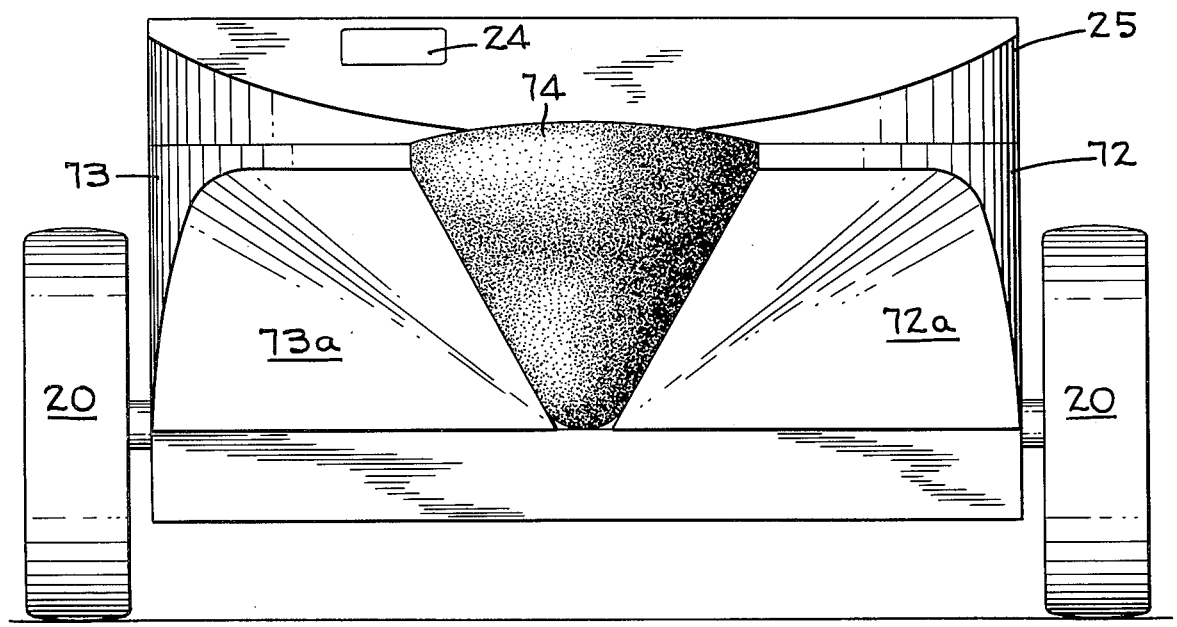
FIG_13
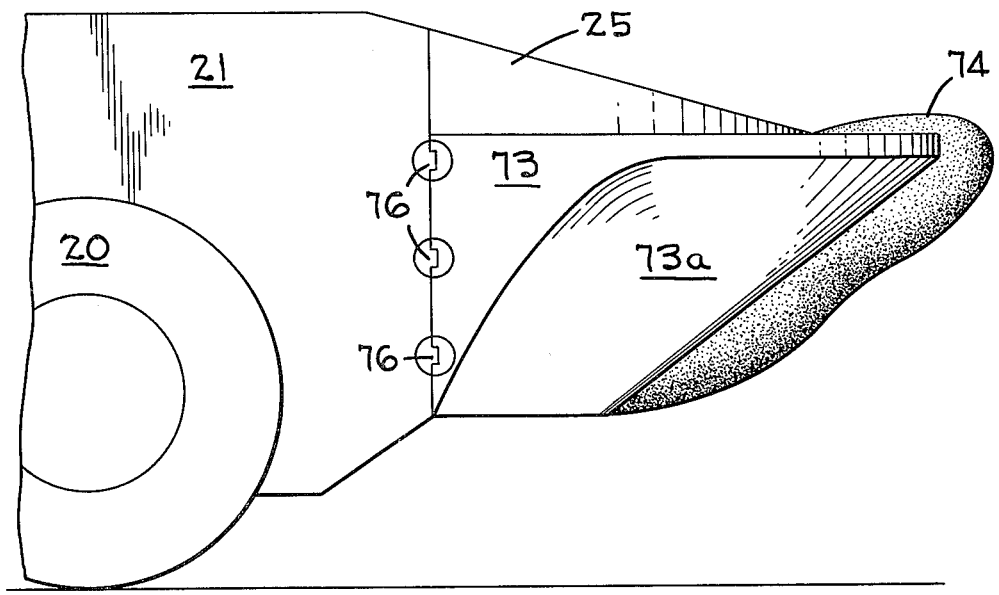
FIG_14

INFLATABLE BOW

The invention herein described was made in the court of or under a contract with the Department of the Navy.

BACKGROUND OF THE INVENTION

1. Field of the Invention

The present invention pertains to floatable units with modifiable bow configurations and more particularly to such units which are capable of being modified to facilitate the travel of the hull along the surface of a body of water.

2. Description of the Prior Art

Structure is known which is associated with various types of vehicles which when either inflated or extended provides additional buoyancy for the vehicle to which the structure is attached. U.S. Pat. No. 1,180,013, Cook et al, for example, discloses an extendable telescoping vehicle nose section and slightly tapered. These telescoping sections nest together within the forward end of the vehicle when retracted and when extended project forwardly to extend the length of the body and thereby increase the bouyancy at the front of the vehicle. A rear extension is also provided which folds over the top of the rear portion of the vehicle when retracted. When the vehicle is prepared to enter a body of water, the front telescoping sections are extended forwardly and the rear section is pivoted to extend rearwardly to thereby provide additional front and rear located buoyancy chambers.

U.S. Pat. No. 2,075,785 issued to Van Caneghem discloses a motorcycle which has both front and rear buoyancy chambers which are retracted while the vehicle is being operated on land and which are extended to provide a high volume displacement when in the water so that the requisite buoyancy may be obtained to keep the vehicle afloat. The motorcycle has a front section wherein side walls are hinged at the lower end on each side of the front wheel. The side walls are joined at the top with what appears to be an extendable cover so that when the side walls are swung to the side, the cover encloses a volume therebetween to provide flotation at the forward end of the vehicle. Similar construction is seen at the rear of the vehicle. It should be noted that Van Caneghem does not utilize a continuous bag to enclose a flotation volume, but relies on external structure with a cover extending therebetween wherein the cover folds when the external structure is closed and extends when the structure is opened.

U.S. Pat. No. 2,967,507, Schulz, shows what is called a "carrier" which is fitted around and under a vehicle and which carries a number of inflatable air chambers located at the front, rear and sides of the vehicle. The carrier is detachable from the vehicle and is only installed when it is desired to travel across water with the vehicle.

U.S. Pat. No. 3,581,701, Gehlen, discloses an amphibious vehicle which carries auxiliary floating members as well as ramps and other structure which may be used for constructing a bridge or a ferry for transporting vehicles across a stretch of water or over a ravine as examples. This apparatus is directed more toward construction for obtaining quick transport across otherwise impassable surfaces than toward structure which will provide buoyancy for an amphibious vehicle itself. Expandible auxiliary floating members are disclosed at the sides of the vehicle. These auxiliary members are filled with air and have upper covers which appear to serve as bridge surfaces in some configurations.

U.S. Pat. No. 3,750,613, Krumsiek et al, discloses a forward and upward extending shield which is mounted at the front end of a vehicle so that as the vehicle is propelled through the water the hydraulic force against the shield tends to keep the bow of the vehicle in a raised condition. The disclosure of U.S. Pat. No. 3,983,832, Kinder describes planing skis which are attached to a vehicle and which are movable between an extended and a retracted position. It should be noted that the planing skis which are stored at the sides of the vehicle in the retracted position may include honeycomb or other similar construction which will add buoyancy to the vehicle when the skis are extended and the vehicle is in the water.

SUMMARY OF THE INVENTION

Structure is disclosed by way of description of this invention which operates to change the bow configuration of a floating hull. A plurality of movable bow segments are attached to the bow portion of the hull and a continuous inflatable bag is attached to the bow segments. Means is provided for moving the bow segments between a retracted and and extended water traveling position. Means is also provided for inflating the continuous bag when the bow segments are in the extended position so that the inflated bag is disposed within the volume between the bow segments. Such means also provides for deflating the bag when the bow segments are in the retracted position so that the deflated bag is enclosed behind and protected by the bow segments.

BRIEF DESCRIPTION OF THE DRAWINGS

FIG. 1 is a diagrammatic perspective view of an amphibious vehicle with a modifiable bow configuration in accordance with the present invention and with the apparatus for changing the bow configuration being shown in its retracted position.

FIG. 2 is a diagrammatic perspective view of a portion of the vehicle of FIG. 1 with the bow changing apparatus being shown in an extended or sea traveling mode.

FIG. 3 is a plan view of the bow of the vehicle of FIG. 1 with a retracted bow configuration.

FIG. 4 is a side elevation view of the bow of the vehicle of FIG. 1.

FIG. 5 is a plan view of the bow of the vehicle in the configuration of FIG. 2.

FIG. 6 is a side elevation view of the bow of the vehicle in the configuration of FIG. 2 with portions thereof being broken away.

FIG. 7 is a section taken along the line 7—7 of FIG. 3.

FIG. 8 is an enlarged section taken along the line 8—8 of FIG. 7.

FIG. 8A is an enlarged section taken along the line 8A—8A of FIG. 7.

FIG. 9 is an enlarged section taken along the line 9—9 of FIG. 11.

FIG. 10 is a front elevation view of the bow of the vehicle in the configuration of FIG. 2.

FIG. 11 is a section taken along the line 11—11 of FIG. 5.

FIG. 12 is a section taken along the line 12—12 of FIG. 6.

FIG. 13 is a front elevation view of the bow configuration of another embodiment of the present invention.

FIG. 14 is a side elevation view of the embodiment of FIG. 13.

DESCRIPTION OF THE PREFERRED EMBODIMENTS

The embodiment of FIG. 1 shows a basic amphibious vehicle including a hull 21 at the front end of which is situated a bow, shown generally at 22. The hull 21 of FIG. 1 represents the main framework structure of the amphibious vehicle. Some means for propelling the vehicle over land or through the water such as driven wheels 20, tracks, etc. (not shown) are operatively attached to each side of the hull. Alternatively, the hull 21 may be the buoyant portion of a floating dry-dock or the like which may be propelled or towed from place to place on the surface of a body of water and which may not need driving wheels or tracks.

The bow portion 22 as seen in FIG. 1 has an upper fixed bow segment 25 which has a forwardly and downwardly sloping upper surface 23 upon which may be mounted such things as headlights, tie-down points, etc. (not shown). An access port cover 24 is faired into the surface 23 to provide access to the interior of the generally hollow bow structure. The bow portion, as seen in FIG. 1, tapers or curves to a point at the forwardmost position and is seen to be somewhat raked. Movable side bow segments 26 and 27 (as best seen in FIG. 2) are mounted on hinges 28 at the right and left sides of the bow portion 22 beneath the stationary bow segment 25. A lower movable bow segment 29 is shown in the retracted position in FIG. 1 and in the extended or lowered position in FIG. 2. An inflatable bag 31 is seen in the view of FIG. 2, projecting forwardly between the right and left movable bow segments 26 and 27 and the lower movable bow segment 29 when the bow segments are extended as shown. The inflatable bag 31 is enclosed and therefore hidden from view and protected by the bow segments when in their retracted positions as seen in FIG. 1. Referring to an amphibious vehicle when the bow segments are in the retracted positions and the bag is deflated as seen in FIG. 1 the configuration of the bow 22 is termed the land mode. When the bow segments are extended and the inflatable bag 31 is pressurized (inflated) as seen in FIG. 2, the bow portion 22 is said to be in the sea mode. When making reference to a floatable unit having a hull 21 such as a dry-dock section, the configuration of the bow portion 22 as seen in FIG. 1 is termed the retracted condition and the configuration of the bow portion as seen in FIG. 2 is termed the extended condition.

The bow portion 22 has a forward bulkhead 32 (FIGS. 7 and 11) to which is attached the upper fixed bow segment 25. The left and right movable bow segments 27 and 26 respectively and the lower movable bow segment 29 are coupled to the bulkhead 32 for pivotal motion at the bow through linkage to be hereinafter described. The bow segments when in the retracted position, as seen in FIG. 4, combine to present the raked bow surface which is useful on an amphibious vehicle in the land mode to ride up and over low (2 to 3 feet high) obstacles which are situated on the ground in the vehicle's path. In this retracted or land mode, the inflatable bag 31 in the deflated condition is gathered behind the outer surfaces of the movable bow segments and stored in the protective chamber afforded by the retracted bow segments as best seen in FIG. 7 of the drawings. An access passage 33 is shown below the access cover 24 in FIG. 7, thereby providing access to the interior of the inflatable bag. The access cover over the access passage is sealed when in the closed position so that the airtight integrity of the continuous inflatable bag 31 is maintained.

The inflatable bag 31 is attached to the edges of the movable bow segments 26, 27 and 29 as typically shown in FIGS. 8 and 8A. A thicker portion 34 of the bag is fabricated at those positions on the bag that run along the edges of the movable bow segments when installed in the bow. FIG. 8 shows that portion of the bow where the upper surface of the left and right movable bow segments 27 and 26 lie adjacent to one another immediately below the fixed bow segment 25. The thicker portions 34 of the inflatable bag have a number of apertures 36 therethrough which are aligned with apertures 37 in flanges 38 and 39 on the movable bow segments 26 and 27 respectively. A series of clamp bars 41 run along the lengths of the thicker portions 34 having a series of square holes 42 formed therein which are in alignment with the aligned apertures 36 and 37 in the thick portion of the bag and the movable bow segment flanges respectively. A number of carriage bolts 43 are provided which pass through the series of aligned holes 36, 37 and 42 and are fastened therein by means of nuts 44 which engage the threads on the carriage bolts. The pressure exerted against the thick portions 34 of the inflatable bag by the clamp bar 41 provides for both load distribution over the attachment point of the bag at the edges of the movable bow segments as well as a clamped seal for each of the apertures 36 through the thick portion of the bag.

Formed integrally with the bag and attached to the thick portions 34 are other relatively thick portions formed of the bag material which are termed "scuff bumpers" 46. The scuff bumpers extend outwardly from the movable bow segments, coming into contact with each other when the bow segments are in the retracted position. The scuff bumpers 46 are positioned along the lines of separation between the moveable bow segments so that when the bow segments are in the retracted condition the inflatable bag 31 is protected from damaging blows and abrasions from objects which may be in the path along which the bow is travelling. Typical configurations of the scuff bumpers 46 along the edges of the bow segments when the segments are retracted are shown in FIGS. 8 and 8A. Furthermore, when the bow segments are in the process of being retracted from the extended position the scuff bumpers 46 prevent any portions of the inflatable bag 31 from being crushed between hard surfaces on the moveable bow segments as they converge into the retracted positions. As seen in FIG. 8 the upper portion of the inflatable bag simply droops into a fold indicated at 31a when the pressure within the bag is relieved and the bow segments are retracted. As seen in FIG. 8A the nose portion of the inflatable bag 31 is withdrawn in a similar fold 31a by means to be hereinafter described.

The left and right moveable bow segments 27 and 26 are moved between the extended and retracted positions by means of a pair of hydraulic or pneumatically actuated cylinder and piston assemblies 47 and 48 respectively as best shown in FIGS. 3 and 5. The cylinder and piston assemblies are attached at one end to the bow forward bulkhead 32 and at the other end to the left and right moveable bow segments. The assemblies contain structure which extends through the bag at reinforced areas or "hard points" on the bag. With the piston arms extended as shown in FIG. 5, the left and right bow segments 27 and 26 are extended as shown. With the piston arms retracted the left and right moveable bow segments are retracted as shown in FIG. 3. With further reference to FIGS. 3 and 5 a pair of posts 49 are seen to be mounted on the bow forward bulkhead 32 at additional bag "hard points". The posts extend forwardly into the bag interior. A cable 51 is attached to the tip of each post. The cable runs past a moving post 52 mounted generally vertically in the inside corner of the left moveable bow segment 27 and is connected at a forward located eye 53. The eye is attached to the inside surface of the inflatable bag 31. Cable 51 is then routed past a second vertically extending post 54 in the right moveable bow segment 26 to an attachment point at the tip of the other post 49. With the inflatable bag 31 in the inflated condition as seen in FIG. 5, the cable 51 is sufficiently long to allow the forward-most portion of the bag 31 to extend fully. When the left and right moveable bow segments 27 and 26 are retracted the moveable posts 52 and 54 attached thereto cause the cable length between the moveable posts and the eye 53 to diminish as the segments are retracted, thereby drawing the nose or the most forward portion of the inflatable bag 31 inwardly so that it is not caught between the forward portions of the moveable bow segments 27 and 26 as they retract. The resulting withdrawal of the bag portion 31a from the region between the edges of the bow segments 26 and 27 and the scuff bumpers 46 is illustrated in FIG. 8A. This same post and cable scheme may be used to withdraw other portions of the inflatable bag 31 where deemed necessary. Further, lengths of bungee (not shown) may be stretched between attachment points at the bow forward bulkhead 32 and eyes fastened to the inner surface of the inflatable bag 31 for the purpose of drawing the bag inwardly within the moveable structure as it is deflated. Thus, the left and right moveable bow segments are pivotally attached to the bow of the floatable hull unit and may be actuated between the extended position of FIG. 5 and the retracted position of FIG. 3.

The lower moveable bow segment 29 is moved between the lowered or extended position and the raised or retracted position by means of yet another piston and cylinder assembly 56 which may be either pneumatically or hydraulically actuated. Assembly 56 is best shown in the drawing of FIG. 6. The cylinder and piston assembly 56 is attached through the inflatable bag 31 at a "hard point" thereon to the lower surface of the fixed bow segment 25 as generally seen in FIG. 7 and as seen in detail in FIG. 9. The description of FIG. 9 will serve to typify the "hard-point" attachments of structure within the inflatable bag 31 while maintaining a seal to preserve the integrity of the bag at the attachment points. The upper end of the cylinder and piston assembly 56 is secured pivotally on a pin 57 which extends betweem the arms of a clevis 58. A channel 59 runs along the underside of the fixed bow segment 25 carrying a block 61 having a threaded hole 62 therein. The bottom surface of the channel 59 has a hole therethrough aligned with the hole 62. A thicker portion 63 of the inflatable bag 31 also has a hole therethrough so that a bolt 64 may be passed through a hole in the clevis, and the aligned holes in the thicker portion 63 of the bag and the channel 59. The bolt threads thereby engage the threaded hole 62 in the block 61. The pressure exerted by the clevis of the thick portion 63 of the bag is sufficient to seal the hole through which the bolt passes at the attachment or "hard-point".

Returning to FIG. 6, the cylinder and piston assembly 56 may be seen to extend between the clevis 58 attached to the fixed bow portion 25 and a 4-bar linkage 64. The 4-bar linkage is attached at one end to the forward bulkhead 32 through the inflatable bag 31 in a manner similar to that described for the attachment point for the clevis 58. The other end of the 4-bar linkage is attached through the wall of the inflatable bag in the aforedescribed manner to the inside surface of the lower moveable bow segment 29. Linkage 64 may be seen to provide a pivotal attachment for the moveable lower bow segment so that it may be swung into the lowered or extended position shown in FIG. 6 by extending the piston arm from the cylinder and piston assembly 56 and may be swung into the raised or retracted position as shown in FIG. 4 by retracting the piston arm in the assembly.

In accordance with the foregoing it may be seen that both the right and left moveable bow segments 26 and 27 and the lower moveable bow segments 29 are pivotally attached to the bow portion 22 at the bow end of the floatable unit or hull 21. The moveable bow segments are positioned in either the retracted position as seen in FIGS. 3, 4 and 7 or the extended position as seen in FIGS. 5, 6 and 11 by the actuating cylinder and piston assemblies 48, 47 and 56 respectively. It should further be noted that a pneumatic line 66 (FIG. 11) is brought through the forward bulkhead 32 and the inflatable bag 31 to the interior thereof from a pneumatic pump (not shown) located in the hull 21. The pneumatic pump is of the well known reversable type so that the inflatable bag may be inflated and deflated by the pump. Inflation is accomplished by directing air under pressure through the line 66 and into the interior of the bag through a nozzle 67 at the end of the line 66. The air pressure is also directed to a pair of accumulators 68 located in the interior of the inflatable bag 31 and attached through the wall of the bag to the bow forward bulkhead 32. The accumulators are pressurized by the pneumatic pump through the line 66 while the bag is deflated and a controlled outlet 69 on each of the accumulators 68 is opened by some convenient means such as an electrically operated valve when the bag is to be inflated so that the influx of air from the pneumatic pump through the nozzle 67 is aided by the stored air under pressure in the accumulators 68.

Also seen in FIG. 11 are hydraulic (or pneumatic) lines 71 extending through the bow forward bulkhead 32 and the wall of the inflatable bag 31. The lines 71 are attached to a hydraulic (or pneumatic) pump (not shown) mounted within the floatable hull 21. The lines 71 are attached to the cylinder and piston assembly 56 as well as the cylinder and piston assemblies 47 and 48 to provide a source of power for actuating the assemblies to position the three movable bow segments between the extended and retracted positions. It may thus be seen that all of the actuating hardware for the movable bow segments as well as the bag attachment hardware and the inflation and deflation structure is located within the inflatable bag 31. In this fashion the bow configuration modification structure is isolated and protected from the corrosive and dust laden atmospheres which may be encountered outside of the inflatable bag. Assembly and maintenance of the inflatable bow actuation hardware included within the interior of the inflatable bag is through the access opening 33 (FIG. 7) which is sealed by the access port cover 24.

FIG. 10 shows the movable bow segments 26, 27 and 29 in the extended position with the volume therebetween filled by the inflatable bag 31 in the inflated condition. It should be noted that the lower forward surfaces 26a and 27a of the laterally pivotal bow segments 26 and 27 are flared to provide for a surface that will turn the water toward the sides of the bow as it moves along the surface of the water. The bow buoyancy is increased as the length of the water line around the bow and the volume of the bow are both increased due to the inflation of the bag 31. The wall of the bag in the region of the water line at the forward surface of the bag is constructed of a greater number of bag fabric plies as seen in the sectional view of FIG. 11 at 31b. The thick construction of the bag in this region provides a greater resistance in the bag wall to expansion when the bag is pressurized. It has been found that appropriate inflation pressures range from 10 to 20 pounds per square inch above the surrounding atmospheric pressure. With such an internal bag pressure and a sufficiently thick bag wall in the region of the bow water-line, the external surface of the bag may be maintained in a concave condition even when the bag is inflated. Thus, the external surface of the bag tends to pass through the surface of a body of water more efficiently as the bag performs in a manner similar to the performance provided by surfaces 26a and 27a.

FIG. 13 depicts an additional embodiment of the present invention wherein left and right pivotal bow segments 72 and 73 respectively are shown having a shape similar to that of the bow segments 27 and 26. The bow segments 72 and 73 are deeper in this embodiment because there is no lower moveable bow segment present. An inflatable bag is attached to the moveable bow segments 72 and 73 as disclosed hereinbefore for the embodiment of FIGS. 1 and 2. The hinge line is slightly longer than that described in the initially described embodiment. An additional hinge point may be added so that there are three hinge points 76 about which the laterally moving bow segments 72 and 73 pivot with respect to the bow of the floatable unit or hull 21. As in the originally described embodiment, a fixed upper bow segment 25 is included. The appropriate moveable bow segment actuation cylinder and piston assemblies, accumulators, bag deflation cables and posts and bag inflation and actuator pressure lines are all included within the interior of the continuous inflatable bag 74 as described for the first embodiment. It should further be noted that the embodiment of FIG. 13 includes the concave external surface on the bag 74 in the region of the water line similar to the bag external configuration seen at 31b for the embodiment depicted in FIG. 11. Surfaces 73a and 72a are flared (or concave) for the purpose of providing efficiency of movement along the surface of a body of water. All other features of the embodiment shown in FIGS. 13 and 14 and the operation thereof are similar to that disclosed for the embodiment of FIGS. 1 and 2.

Although the best mode contemplated for carrying out the present invention has been herein shown and described, it will be apparent that modification and variation may be made without departing from what is regarded to be the subject matter of the invention.

What is claimed is:

1. A floatable unit, comprising
a substantially watertight hull,
fixed bow structure attached to the forward end of said hull,
left and right movable bow segments attached to said fixed bow structure,
means for pivotally attaching each of said left and right bow segments to said bow structure so that said segments are movable between a laterally located extended position and a retracted position substantially faired with the bow,
means for driving said bow segments between said extended and retracted positions,
a continuous pliable air bag connected to and extending between said bow segments,
and means for inflating said air bag when said movable bow segments are extended and for deflating said air bag when said movable bow segments are retracted, so that said air bag is distended within the volume between said movable bow segments when in the inflated condition and is enclosed by said bow segments when in the deflated condition.

2. Apparatus as in claim 1 wherein said air bag comprises a heavier ply construction at the forward portion thereof than at the other bag portions so that the forward exterior surface of the bag is concave in the region of the water line at the bow.

3. Apparatus as in claim 1 together with resilient bumpers attached along the adjacent edges of said movable bow segments so that when said bow segments are retracted said air bag is protected by said bumpers.

4. Apparatus as in claim 1 wherein said means for driving comprises cylinder and piston assemblies disposed within said air bag, whereby said assemblies are isolated from the environment external to said bag.

5. Apparatus as in claim 4 wherein said cylinder and piston assemblies are fixed between said bow and said bow segments at attachment points, said air bag having an aperture therethrough at said attachment points, together with means for sealing said apertures when said cylinder and piston assemblies are fixed in place.

6. Apparatus as in claim 1 together with a lower movable bow segment,
means for pivotally attaching said lower bow segment to said fixed bow structure so that said lower segment is movable between a lower extended position and a raised retracted position,
and means for driving said lower bow segment between said extended and retracted positions concurrently with said left and right bow segments.

7. Apparatus as in claim 1 wherein said fixed bow structure comprises
a bow forward bulkhead, and
an upper fixed bow segment attached to said bow forward bulkhead overlying said air bag.

8. A floatable apparatus, comprising,
a floatable hull,
a fixed bow at one end of said hull,
left and right movable bow segments attached to said fixed bow,
a lower movable bow segment attached to said fixed bow,
means for pivotally attaching each of said left and right bow segments to said bow so that said segments are movable between a laterally located extended position and a retracted position substantially faired with said bow,
means for pivotally attaching said lower bow segment to said bow so that said segment is movable between a lower extended position and a raised retracted position, means for driving said bow segments between said extended and retracted positions, a collapsible bag disposed between and connected to said movable bow segments, and means for inflating said bag when said movable bow segments are extended and for deflating said bag when said movable bow segments are retracted, whereby said bag substantially fills the volume between said movable bow segments when in the inflated condition and is enclosed by said bow segments when in the deflated condition.

9. Apparatus as in claim 8 wherein said collapsible bag comprises a multi-ply wall construction and wherein a waterline region extends across the forward surface of said bag, said bag further comprising a greater number of plies in the wall within said waterline region so that the external surface of said region is concave.

10. Apparatus as in claim 8 together with resilient bumpers attached to said bow segments along the edges thereof whereby said collapsible bag is prevented from being crushed between said bow segments and from being exposed to damaging blows from external obstacles when enclosed by said bow segments in the deflated condition.

11. Apparatus as in claim 10 wherein said resilient bumpers comprise an integral part of said collapsible bag.

12. Apparatus as in claim 8 wherein said means for driving, comprises a plurality of piston and cylinder assemblies coupled between the bow and ones of said segments, and wherein said collapsible bag has a plurality of apertures therein corresponding to a plurality of attachment points between said bag and said bow segments, said piston and cylinder assemblies being placed at ones of said apertures, and means for sealing said apertures when said cylinder and piston assemblies are installed, whereby said assemblies are contained within said bag.

13. Apparatus as in claim 8 wherein said means for inflating includes an accumulator and means for exhausting said accumulator to the interior of said collapsible bag during inflation, whereby inflation time is decreased.

14. In a floating hull having a bow, the improvement comprising apparatus for changing the bow configuration of the floating hull, comprising a plurality of movable bow segments pivotally attached to the bow, a continuous inflatable collapsible bag attached to said bow segments, means for moving said bow segments between retracted and extended positions, means for inflating said bag when said bow segments are in said extended position so that said bag is disposed therebetween to provide a flotation volume when inflated and for deflating said bag when said bow segments are in said retracted position so that said deflated bag is enclosed by said bow segments, and a waterline region on said inflatable bag extending across the forward surface thereof, said bag comprising a multi-ply wall construction and having a greater number of plies in the wall within said waterline region so that the external surface of said region is concave.

15. In a floating hull having a bow, the improvement comprising apparatus for changing the bow configuration of the floating hull, comprising a plurality of movable bow segments pivotally attached to the bow, a continuous inflatable collapsible bag, means formed along the edges of said bow segments for attaching said collapsible bag thereto, means for moving said bow segments between retracted and extended positions, and means for inflating said bag when said bow segments are in said extended position so that said bag is disposed therebetween to provide a flotation volume when inflated and for deflating said bag when said bow segments are in said retracted position so that said deflated bag is enclosed by said bow segments, and resilient bumpers disposed along the edges of said bow segments adjacent to said means for attaching, whereby said collapsible bag is prevented from being crushed between said bow segments and from being exposed to damaging blows from external obstacles when enclosed by said bow segments in the deflated condition.

16. In a floating hull having a bow, the improvement comprising apparatus for changing the bow configuration of the floating hull, comprising a plurality of movable bow segments pivotally attached to the bow, a continuous inflatable collapsible bag attached to said bow segments, means for moving said bow segments between retracted and extended positions, means for inflating said bag when said bow segments are in said extended position so that said bag is disposed therebetween to provide a flotation volume when inflated and for deflating said bag when said bow segments are in said retracted position so that said deflated bag is enclosed by said bow segments, and resilient bumpers attached to said bow segments along the edges thereof whereby said collapsible bag is prevented from being crushed between said bow segments and from being exposed to damaging blows from external obstacles when enclosed by said bow segments in the deflated condition, said resilient bumpers comprising an integral part of said collapsible bag.

17. In a floating hull having a bow, the improvement comprising apparatus for changing the bow configuration of the floating hull, comprising a plurality of movable bow segments attached to the bow, a continuous inflatable bag attached to said bow segments, a plurality of piston and cylinder assemblies coupled between the bow and ones of said bow segments operating to move said bow segments between retracted and extended positions, said inflatable bag having a plurality of apertures therein corresponding to a plurality of attachment points between said bag and said bow segments, said piston and cylinder assemblies being placed at ones of said apertures, means for sealing said apertures when said cylinder and piston assemblies are installed, whereby said assemblies are contained within said bag, and means for inflating said bag when said bow segments are in said extended position so that said bag is disposed therebetween to provide a flotation volume when inflated and for deflating said bag when said bow segments are in said retracted position so that said deflated bag is enclosed by said bow segments.

* * * * *